March 3, 1936.  W. V. STEARNS  2,032,601
APPARATUS FOR PURIFYING MERCURY
Filed Feb. 24, 1934   3 Sheets-Sheet 1
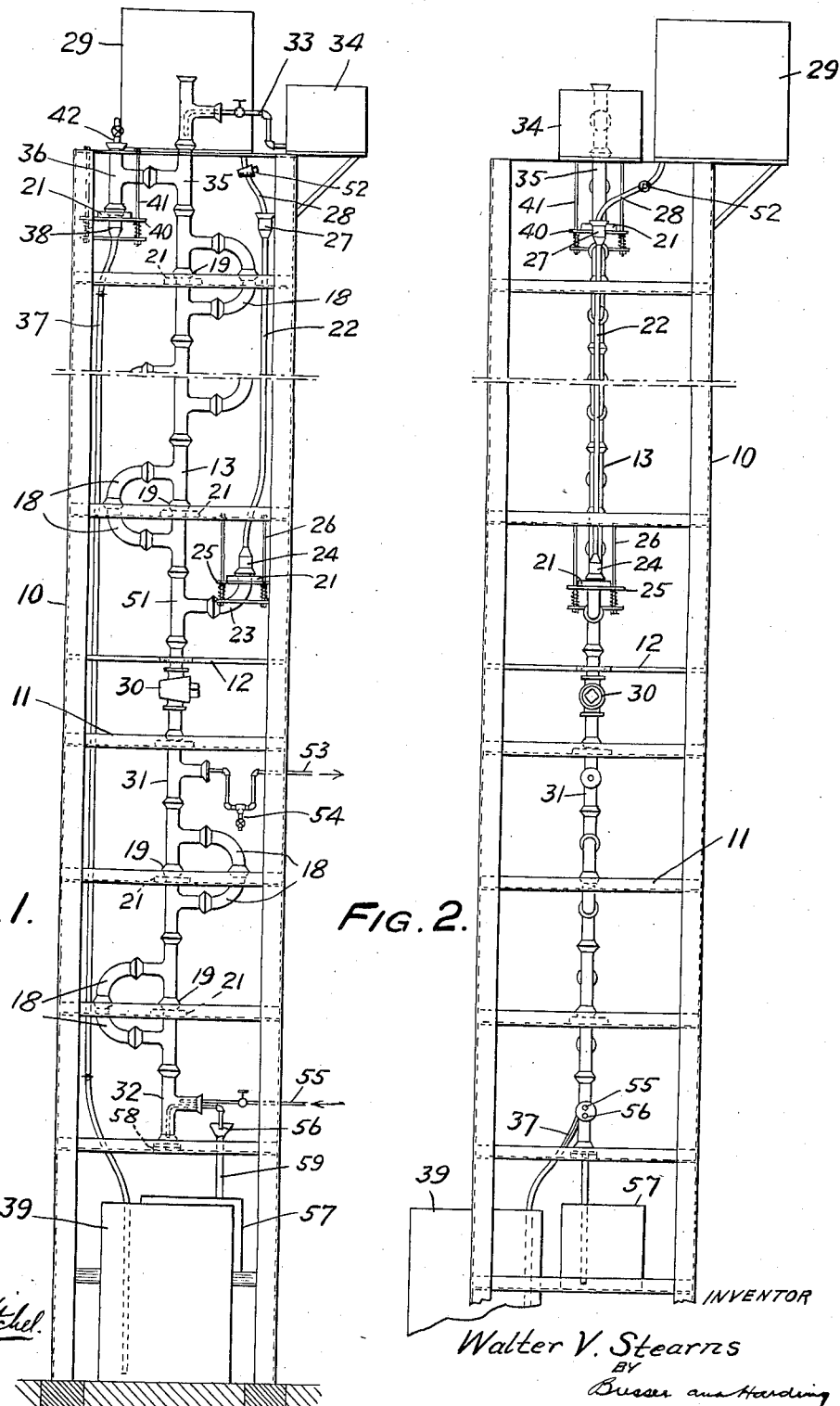

March 3, 1936.  W. V. STEARNS  2,032,601
APPARATUS FOR PURIFYING MERCURY
Filed Feb. 24, 1934   3 Sheets-Sheet 2
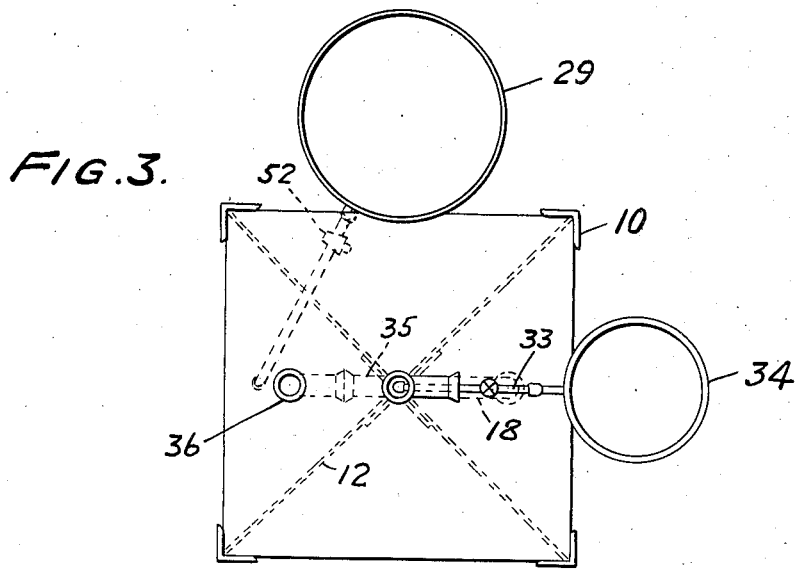
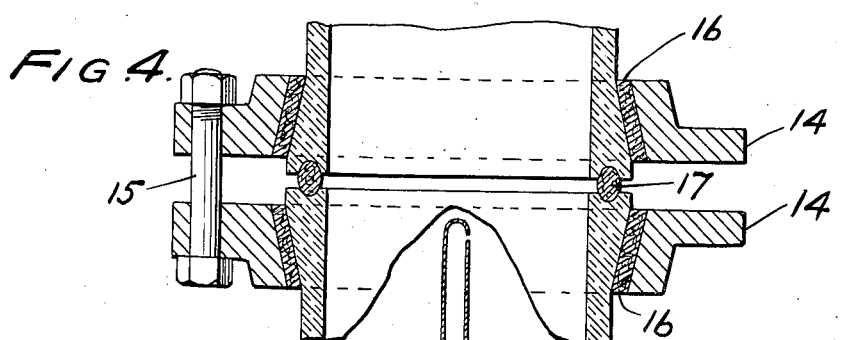
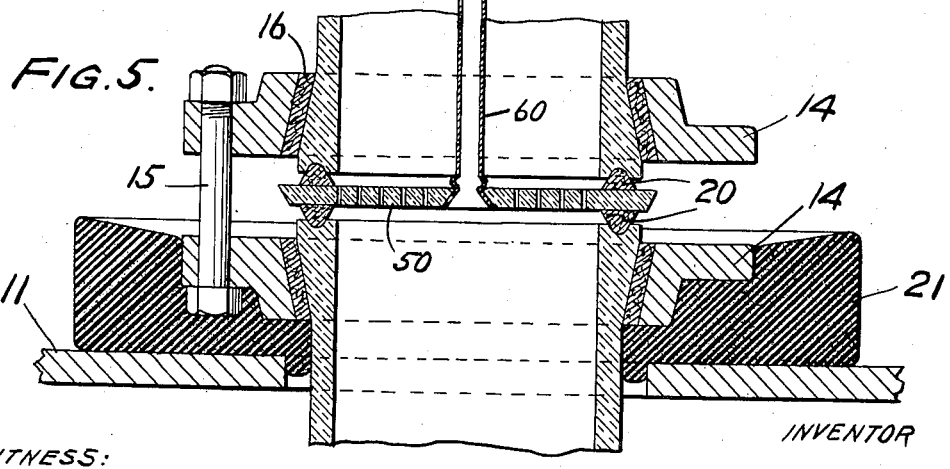
INVENTOR
Walter V. Stearns
BY
Busser and Harding
ATTORNEYS.

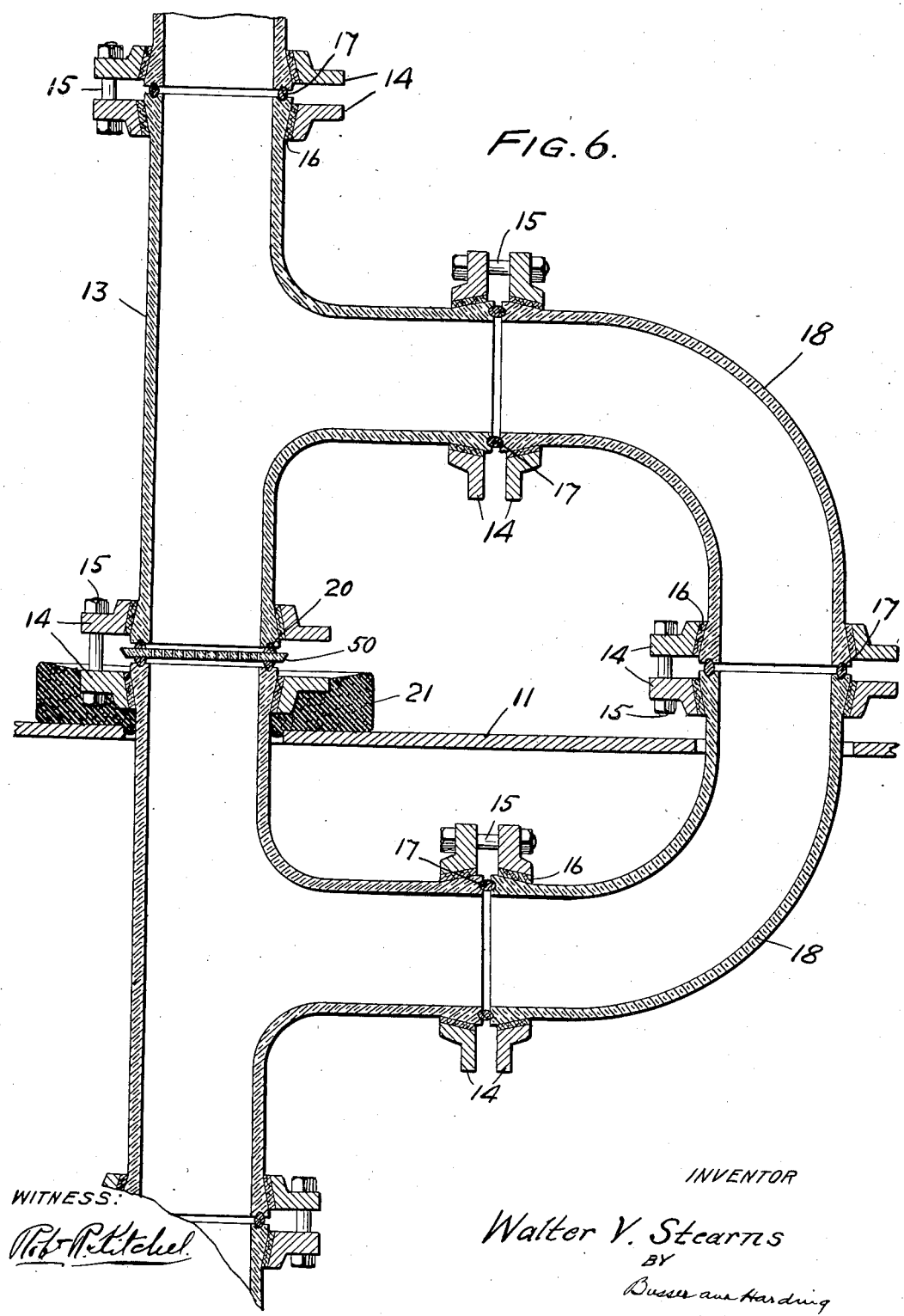

Patented Mar. 3, 1936

2,032,601

UNITED STATES PATENT OFFICE 2,032,601

APPARATUS FOR PURIFYING MERCURY

Walter V. Stearns, Philadelphia, Pa., assignor to Sun Oil Company, Philadelphia, Pa., a corporation of New Jersey Application February 24, 1934, Serial No. 712,735

10 Claims. (Cl. 266—1)

The present invention relates to an apparatus for purifying mercury.

The object of the present invention is to provide an apparatus for continuously purifying mercury by means of nitric acid, and to continuously wash the purified mercury after contact with the acid.

Another object of the invention is to provide an apparatus which may be readily disassembled for cleaning and an apparatus from which any broken part may be removed and replaced without disturbing the entire apparatus.

In the drawings:

Fig. 1 represents a front elevation of the apparatus,

Fig. 2 represents a side elevation,

Fig. 3 is a plan view,

Fig. 4 is a sectional view of the pipe joints used to connect the various parts of the apparatus, Fig. 5 is a sectional view of a pipe joint and support having a porcelain filter plate between the pipe sections, and Fig. 6 is a sectional view of a portion of the water washing section of the column.

The apparatus is supported by a metallic framework having vertical angles 10 and horizontal trays 11, sufficient trays being included to insure a rigid framework and to provide platforms for assembling or disassembling the apparatus. The trays are provided with an upstanding marginal flange which enables them to hold acid and mercury thereby protecting the operator in case of breakage or leakage. The apparatus itself is partly supported by the trays 11, and partly by centering clamps 12, one only of which is shown, which also maintain the apparatus in a rigid vertical position.

The apparatus for purifying and washing the mercury consists essentially of a vertical tube through which the mercury is passed downwardly while the nitric acid solution is passed upwardly from a point about midway from the bottom of the apparatus to the top thereof, water being admitted at the bottom of the tube and passed upwardly to a point just below the acid inlet, where it is drawn off from the vertical tube. Throughout the length of the tube there are positioned at spaced intervals, a number of porcelain filter plates which act to collect the mercury and divide it into a multiplicity of streams for further passage either through the nitric acid or water, depending upon the portion of the vertical tube the mercury is then passing through. Since the acid solution or water cannot pass upwardly through the filter plates while mercury is passing downwardly therethrough, it is necessary to provide by-passes, to carry the water or acid, around the filter plates. Since it is necessary to have a number of breaks in the tube to provide for insertion of filter plates, and to provide connections for by-passing the fluids used, I employ substantially only "Pyrex" or other glass T's and 90° elbows in making up the apparatus.

The main central tube, down through which the mercury passes, is built up of the straight-through or head portions of the glass T-fittings 13. These fittings are joined together as shown in Fig. 4 by means of cast iron flanges 14, which are held together by bolts 15. Between the fittings and the flanges are inserted paraffin coated asbestos gaskets 16 and between the ends of the glass fittings there are placed asbestos gaskets 17 which fit into annular grooves provided in the ends of the fittings, except at the joints 19 which are provided with porcelain filter plates 50 of the "Coors" type set between two paraffin coated asbestos gaskets 20, which gaskets fit into annular grooves in the ends of the fittings. The porcelain filter plates 50 which are placed in the acid stages have vent tubes 60 placed therein to vent any gases formed by the action of the acid on the mercury. The porcelain filter plates in the water stages, however, do not have vent tubes therein as no gases are formed. This construction is shown in Fig. 5. At points where the tube is supported on trays 11, the lower cast iron flange 14 is set within a sponge rubber gasket 21, the sponge rubber gasket resting upon a tray 11. The stem portions of each two of the glass T-fittings having filter plates 50 therebetween, are joined together by means of two 90° elbows, 18, forming a U-shaped by-pass around each of the joints 19.

The stem portion of a single T-fitting 51 at the center of the glass column is joined to a length of glass tubing 22, by means of an elbow 23 and a reducer 24, the joint between the elbow and the T-fitting and the elbow and the reducer being the same as the joint shown in Fig. 4.

The glass tube 22 may be a single length of tubing if desired, or may consist of a number of short lengths joined together by joints of the type shown in Fig. 4. This tube, as well as the elbows 23 and the reducing fitting 24, is supported on the metallic plate 25 resiliently suspended from a tray 11, immediately above, by means of bolts 26, there being a sponge rubber gasket 21 between the lower flange, forming part of the connection between the bend and reducing fitting, and the plate 25. Springs 80 are placed between the bolt head and the plate 25 to provide a more resilient support and thereby relieve strain and permit adjustment. The upper end of tube 22 has a funnel-like fitting 27, into which a short length of glass tubing 28 containing a glass cock 52, leads from an earthenware acid jar 29, which arrangement permits settling of the column due to the weight of the mercury added to the system. Immediately below the single T-fitting 51 into which the tube 22 is connected, there is placed a stoneware plug cock 30. The stem portion of the lowermost fitting 32 in the column is provided with a water inlet in the form of a metal pipe 55. There is also provided another metal pipe 56, which passes through the stem portion of the fitting into the vertical head portion and thence downwardly almost to the lower end of the glass column, which is sealed off in any suitable manner. The other end of the pipe 56 leads to a funnel 59 which in turn leads to mercury receiving pot 57. The lower end of fitting 32 contains a drain (not shown) and is supported on a pad 58. Immediately below the plug cock 30 is a T-fitting 31 to which is connected a metal water pipe 53 to permit the outlet of water admitted at the bottom of the column for washing the mercury. Pipe 53 contains a trap having a valve 54 to permit draining any mercury which might be carried out with the water.

The stem portion of the topmost T-fitting 35 in the column connects with a steel pipe 33, which in turn is connected to an iron pot 34, containing the mercury to be purified. Line 33 contains a valve for controlling the flow of mercury from the pot 34 into the top of the column. The stem portion of fitting 35 is connected to the stem portion of another T-fitting 36, the lower end of the head portion of which is connected by means of a reducer 38 to glass tube 37 which in turn leads to an acid jar 39 at the bottom of the tower to receive the spent acid. The glass tube 37 is preferably made up of a number of short lengths of glass tubing, joined as shown in Fig. 4. The weight of the tube 37 and fittings 36 and 38 is supported on plate 40 by means of bolts 41, suspended from the tower supporting structure. Springs 81 on bolts 41 provide a more resilient support for the plate 40. Between the plate 40 and the lower iron flange, joining fittings 36 and 38, is placed a sponge rubber gasket 21 similar to that shown in Fig. 5. The upper portion of the fitting 36 is provided with a valved vent 42.

In operation, a 20–25 per cent solution of nitric acid, in which a small amount of mercury has been dissolved, is fed from the jar 29 through tubes 28 and 22 into the main column of the apparatus. The acid flows up through the column, filter plates, and by-passes, and completely fills the column up to the stem portions of the T-fittings 35 and 36. When the column has been filled from the plug cock 30 to the top and a steady flow of acid solution has been instituted and regulated by cock 52, mercury is admitted from the iron pot 34. The mercury so admitted is divided into a multiplicity of small streams by a filter plate set in the joint 19 just below its entrance point, and flows through the acid contained in the first few lengths of the column to the first by-pass where it is again divided into a number of small streams, whence it flows to the next filter plate, etc.

The acid solution meanwhile, is forced to flow upwardly, by the liquid head in jar 29, through the main column and to by-pass the filter plates by flowing through the U-tubes formed by the various 90° bends and the stem portions of the T-fittings. The mercury is thus in contact with the acid until it reaches the plug cock 30, which is closed. The acid, after contact with the mercury, passes out through the stem portions of fittings 35 and 36, and thence downwardly through tube 37 to acid jar 39. When a flow of acid solution through the system has been established, the vent 42 is opened to prevent syphonic flow of acid from the main column to acid jar 39. Meanwhile, distilled water has been admitted through pipe 55 to fitting 32 and has filled the column up to the level of the stem portion of the fitting 31. Thereafter a steady flow of water upwardly through the lower portion of the column is maintained. When a slight head of mercury accumulates above the plug cock 30, which, as already stated, is closed, cock 30 is opened slightly so as to pass the mercury downwardly at the same rate it is admitted at the top of the column. This operation maintains a pool of mercury above the plug cock 30 forming a seal which prevents the water in the lower portion of the column from passing upwardly into the acid section of the column. The mercury flows downwardly through the water or washing section of the column and is divided at each by-pass into a multiplicity of streams to insure complete contact with the water. Since the lowermost end of the main column is sealed off, mercury will collect in the lowermost portion of the head of T-fitting 32 and will rise to above the level of the pipe 43 hereinbefore described. When the level reaches a point above that of the pipe 43, mercury will flow from the apparatus to iron pot 57. After the system has once been put into operation, it is only necessary to add acid to jar 29 and mercury to pot 34 to continuously clean mercury.

It has been found that an apparatus constructed with 2″ glass Ts is capable of cleaning 10,000 pounds of mercury in one day. The number of stages which have been found advisable are seven stages for acid cleaning and three for washing after cleaning.

It is to be understood that material other than "Pyrex" or other glass may be used for the various fittings, etc., without departing from the spirit and scope of the invention, it being necessary that any substitute material be inert to acid and mercury.

It is also to be understood that acid solutions of varying concentrations may be used, but it has been found that a 20 per cent solution is the best for the present purpose.

I do not herein claim the herein described process of cleaning mercury. The subject matter herein claimed is restricted to the apparatus herein shown and described; the novel process therein carried out being the subject matter of my co-pending application Serial No. 712,736, filed February 24, 1934.

I claim:

1. An apparatus for purifying mercury comprising a column having a series of cleaning stages in its upper portion for contacting mercury with acid solution, and a series of washing stages in its lower portion for contacting mercury with water, and means for admitting acid to the lowermost acid cleaning stage and flowing such acid upwardly through the acid stages.

2. An apparatus for purifying mercury comprising a column having a series of cleaning stages in its upper portion for contacting mercury with acid solution, and a series of washing stages in its lower portion for contacting mercury with water, and means for admitting water to the lowermost water washing stage and flowing such water upwardly through the washing stages only.

3. An apparatus for purifying mercury comprising a column having a series of cleaning stages in its upper portion for contacting mercury with acid solution, and a series of washing stages in its lower portion for contacting mercury with water, and means for admitting acid solution to the lowermost cleaning stage and passing it upwardly through the column to the topmost cleaning stage.

4. An apparatus for purifying mercury comprising a column having a series of cleaning stages in its upper portion for contacting mercury with acid solution, and a series of washing stages in its lower portion for contacting mercury with water, separating means between each of said stages for dividing the mercury into a multiplicity of fine streams, and means for by-passing acid solution and water around said separating means between the several acid and water stages.

5. An apparatus for purifying mercury comprising a sectional column having an upper series of cleaning stages for contacting mercury with acid solution and a lower series of washing stages for contacting mercury with water, a mercury inlet at the top of the said column and a mercury outlet at the bottom of said column, said column comprising a series of connected glass tubes, each of said cleaning and washing stages being separated by a foraminous disk clamped between two sections of said glass tubing, by-passes around each of said foraminous disks, a water inlet at the bottom of said column, a water outlet from the uppermost washing stage, an acid inlet above said water outlet and an acid outlet from the uppermost cleaning stage, and means between said water outlet and said acid inlet to prevent admixture of the water and acid in the column.

6. An apparatus for washing mercury comprising a sectional column having its body portion made up substantially of the head portions of glass T-fittings, a mercury inlet connected to the topmost T-fitting, an acid outlet connected to the stem portion of the fitting immediately below the topmost fitting, an acid inlet connected to the stem portion of a fitting substantially midway between the top and bottom of said column, a series of substantially equally spaced foraminous disks between the mercury inlet and the acid inlet, each foraminous disk being clamped between the ends of two T-fitting head sections, U-tubes joining the stem portions of the fittings having said foraminous disks therebetween to provide by-passes around said disks, a valve immediately below said acid inlet fitting, a water outlet connected to the fitting immediately below said valve, a water inlet and a mercury outlet connected to the lowermost fitting in said column, a second series of substantially equally spaced foraminous disks between said water inlet and said water outlet, each of said last mentioned foraminous disks being clamped between the ends of two T-fitting head sections, and U-tubes joining the stem portions of the fittings having said foraminous disks therebetween to provide by-passes around said last mentioned disks.

7. An apparatus for purifying mercury comprising a column having a series of cleaning stages in its upper portion for contacting mercury with acid solution, and a series of washing stages in its lower portion for contacting mercury with water, means for admitting acid to the lowermost acid cleaning stage and flowing such acid upwardly through the acid stages, means for venting the gases formed in one of said acid cleaning stages to the stage next above, and means for venting the uppermost said acid cleaning stage to the atmosphere.

8. An apparatus for purifying mercury comprising a sectional column having an upper series of cleaning stages for contacting mercury with acid solution and a lower series of washing stages for contacting mercury with water, a mercury inlet at the top of the said column and a mercury outlet at the bottom of said column, said column comprising a series of connected glass tubes, each of said cleaning and washing stages being separated by a foraminous disk clamped between two sections of said glass tubing, by-passes around each of said foraminous disks, a gas vent tube extending through each of said foraminous disks in each of said acid cleaning stages into the stage next above, a water inlet at the bottom of said column, a water outlet from the uppermost washing stage, an acid inlet above said water outlet and an acid outlet from the uppermost cleaning stage, and means between said water outlet and said acid inlet to prevent admixture of the water and acid in the column.

9. An apparatus for purifying mercury comprising a column having a series of cleaning zones, means above each cleaning zone adapted, in the downflow of mercury thereinto, to divide the mercury into a multiplicity of fine streams, an acid inflow pipe opening into the lowest cleaning zone, and by-passes around said means between adjacent zones through which acid is adapted to flow upward from one zone to the zone above it and thence upward through the latter zone and so on through the succeeding zones in contact with downflowing mercury and in reverse direction thereto.

10. An apparatus for purifying mercury comprising a column having a series of cleaning zones, means above each cleaning zone adapted, in the downflow of mercury thereinto, to divide the mercury into a multiplicity of fine streams, an acid inflow pipe opening into the lowest cleaning zone, and by-passes around said means between adjacent zones through which acid is adapted to flow upward from one zone to the zone above it and thence upward through the latter zone, a series of washing zones below the series of cleaning zones, means above each washing zone adapted in the downflow of mercury thereinto, to divide the mercury into a number of fine streams, a water inflow pipe opening into the lowest washing zone and by-passes around the last named means between adjacent zones through which water is adapted to flow upward from one zone to the zone above it, and thence upward through the latter zone.

WALTER V. STEARNS.